(12) United States Patent
Brenner et al.

(10) Patent No.: US 12,341,210 B2
(45) Date of Patent: Jun. 24, 2025

(54) ENERGY STORAGE SYSTEM

(71) Applicant: Clarios Advanced Solutions GmbH, Hannover (DE)

(72) Inventors: Helge Brenner, Hannover (DE); Ralf Joswig, Buchholz (DE); Markus Hoh, Wunstorf (DE)

(73) Assignee: Clarios Advanced Solutions GmbH, Hannover (DE)

( * ) Notice: Subject to any disclaimer, the term of this patent is extended or adjusted under 35 U.S.C. 154(b) by 702 days.

(21) Appl. No.: 16/338,949

(22) PCT Filed: Oct. 4, 2017

(86) PCT No.: PCT/EP2017/075127
§ 371 (c)(1),
(2) Date: Apr. 2, 2019

(87) PCT Pub. No.: WO2018/065438
PCT Pub. Date: Apr. 12, 2018

(65) Prior Publication Data
US 2021/0288366 A1    Sep. 16, 2021

(30) Foreign Application Priority Data

Oct. 4, 2016  (DE) .......................... 102016118753.4

(51) Int. Cl.
*H01M 50/249*    (2021.01)
*H01M 10/6554*    (2014.01)
(Continued)

(52) U.S. Cl.
CPC ..... *H01M 50/249* (2021.01); *H01M 10/6554* (2015.04); *H01M 50/159* (2021.01);
(Continued)

(58) Field of Classification Search
CPC .......... H01M 50/209; H01M 10/6554; H01M 50/249; H01M 50/516; H01M 50/505;
(Continued)

(56) References Cited

U.S. PATENT DOCUMENTS

2004/0137321 A1    7/2004  Savaria
2006/0127759 A1*   6/2006  Bechtold ................. B29C 66/61
                                                        429/185

(Continued)

FOREIGN PATENT DOCUMENTS

CN    201435416 Y    3/2010
CN    102468463 A    5/2012
(Continued)

OTHER PUBLICATIONS

International Search Report of the European Patent Office dated Feb. 15, 2018, for PCT/EP2017/075127 filed Oct. 4, 2017, 9 pages.

*Primary Examiner* — Brian R Ohara
*Assistant Examiner* — Emily Elizabeth Freeman
(74) *Attorney, Agent, or Firm* — Boardman & Clark LLP (57) ABSTRACT

Disclosed is an energy storage system, in particular for use in a vehicle, preferably for use in a hybrid vehicle, wherein the energy storage system has the following: a multiplicity of lithium ion cells, a housing with an interior space for receiving the lithium-ion cells and having an opening and a cover device. A barrier layer is provided, at least in certain areas, between the interior of the housing and the inner faces of the housing which bound the interior. In this context, the cover device can be or is connected to the housing in such a way that the opening of the housing is or can be closed, specifically in such a way that the cover device forms, at least in certain areas, an outer face of the housing which is
(Continued)

closed in this way. The cover device is preferably embodied as a cooling device for regulating the temperature of the energy storage system.

18 Claims, 4 Drawing Sheets

(51) Int. Cl.
| | |
|---|---|
| *H01M 50/159* | (2021.01) |
| *H01M 50/169* | (2021.01) |
| *H01M 50/209* | (2021.01) |
| *H01M 50/222* | (2021.01) |
| *H01M 50/227* | (2021.01) |
| *H01M 50/231* | (2021.01) |
| *H01M 50/276* | (2021.01) |
| *H01M 50/293* | (2021.01) |
| *H01M 50/367* | (2021.01) |
| *H01M 50/503* | (2021.01) |
| *H01M 50/505* | (2021.01) |
| *H01M 50/516* | (2021.01) |

(52) U.S. Cl.
CPC ....... *H01M 50/169* (2021.01); *H01M 50/209* (2021.01); *H01M 50/222* (2021.01); *H01M 50/227* (2021.01); *H01M 50/231* (2021.01); *H01M 50/276* (2021.01); *H01M 50/293* (2021.01); *H01M 50/367* (2021.01); *H01M 50/503* (2021.01); *H01M 50/505* (2021.01); *H01M 50/516* (2021.01); *H01M 2220/20* (2013.01)

(58) Field of Classification Search
CPC ............ H01M 50/159; H01M 50/169; H01M 2220/20
See application file for complete search history.

(56) References Cited

U.S. PATENT DOCUMENTS

| | | | | |
|---|---|---|---|---|
| 2012/0103714 | A1* | 5/2012 | Choi | H01M 50/20 180/68.5 |
| 2012/0125447 | A1* | 5/2012 | Fuhr | H01M 50/258 137/260 |
| 2012/0183823 | A1* | 7/2012 | Von Borck | H01M 10/653 429/81 |
| 2013/0004822 | A1 | 1/2013 | Hashimoto | |
| 2013/0032219 | A1* | 2/2013 | Heim | F16K 17/16 137/14 |
| 2013/0045411 | A1* | 2/2013 | Bauer | F28F 3/025 429/120 |
| 2014/0248524 | A1* | 9/2014 | Wang | H01M 50/129 156/182 |
| 2014/0363712 | A1* | 12/2014 | Wohrle | H01M 50/116 429/94 |
| 2015/0280193 | A1* | 10/2015 | Ohshiba | H01M 10/658 361/535 |
| 2016/0268656 | A1* | 9/2016 | Park | H01M 50/204 |
| 2016/0285140 | A1* | 9/2016 | Kimura | H01M 10/6562 |

FOREIGN PATENT DOCUMENTS

| | | | |
|---|---|---|---|
| CN | 103367661 A | 10/2013 | |
| CN | 103413989 A | 11/2013 | |
| CN | 203859168 U | 10/2014 | |
| CN | 204130608 U | 1/2015 | |
| CN | 204651375 U | 9/2015 | |
| CN | 205050906 U | 2/2016 | |
| CN | 205069720 U | 3/2016 | |
| CN | 105514319 A | 4/2016 | |
| CN | 205177901 U | 4/2016 | |
| CN | 105552268 A | 5/2016 | |
| DE | 10 2011 075 318 A1 | 11/2012 | |
| DE | 10 2012 205810 A1 | 10/2013 | |
| DE | 10 2014 102053 A1 * | 8/2015 | .......... H01M 50/502 |
| JP | 2006 079909 A | 3/2006 | |
| KR | 20090092108 A * | 8/2009 | |

* cited by examiner

ENERGY STORAGE SYSTEM

This application is a National Stage Entry of PCT/EP2017/075127, filed Oct. 4, 2017, entitled "ENERGY STORAGE SYSTEM".

This application relates to an energy storage system based on lithium-ion cells, particularly for use in a vehicle, preferably an energy storage system for use in a hybrid vehicle.

In recent years, energy storage systems based on lithium-ion technologies have been playing an ever more significant role, particularly as regards the provision of an efficient energy storage system that can produce a high power.

When using lithium-ion-based energy storage systems, care must be taken to seal the elements containing the lithium-ion technology. If, namely, water penetrates into such elements, it can react, and there is a risk of fire and deflagration owing to the large amount of heat generated.

Energy storage systems which are based on lithium-ion technologies are therefore conventionally manufactured in such a way that the individual lithium-ion cells are sealed off with respect to their environment individually by means of a cell housing.

However, this entails the disadvantage that the production of such energy storage systems is relatively complex. Moreover, this leads to a rise in production costs and to an increase in production time.

Since, furthermore, it is predominantly metal cell housings which are used for reliable sealing, this also increases the overall weight of the energy storage system, which is unwanted particularly in respect of use in a vehicle.

It is therefore the underlying object of the invention to provide an improved, simple and robust energy storage system which does not have the disadvantages of the prior art and can furthermore be produced in a simple and low-cost manner.

Regarding the energy storage system, the object on which the invention is based is achieved according to the invention by the subject matter of independent patent claim 1. Advantageous developments are specified in the dependent patent claims.

Thus, according to the invention, an energy storage system, in particular for use in a vehicle, preferably for use in a hybrid vehicle, is specified. Here, the energy storage system has the following: a multiplicity of lithium-ion cells, each having a positive pole and a negative pole, a housing with an interior space for receiving the lithium-ion cells, and a cover device. The housing is formed from plastic, at least in some region or regions, in particular completely, and has an opening. A barrier layer is provided, at least in some region or regions, in particular completely, i.e. on the entire inner surface of the housing, between the interior space and the inner surfaces of the housing which delimit the interior space. The cover device is or can be connected to the housing in such a way that the opening of the housing is or can be closed, and therefore the cover device forms, at least in some region or regions, an outer surface of the housing which is closed in this way.

The advantages of the invention are obvious. The energy storage system according to the invention enables the housing to be manufactured from inexpensive, easily deformed materials. The provision of a barrier layer between the interior space and the inner surfaces of the housing which delimit the interior space renders the provision of individual cell housings for the lithium-ion cells superfluous. By virtue of the advantageous integration of the sealing function into the housing or the barrier layer, the number of parts in the energy storage system can advantageously be reduced. The required method steps for the production and assembly of the energy storage system are also thereby reduced. A compact, inexpensive and robust energy storage system, which is furthermore simple to manufacture, can thereby be made available.

As a result, the aforementioned disadvantages relating to the weight of the energy storage system are also avoided. Owing to the fact that the housing is manufactured from a plastic, the overall weight of the energy storage system can furthermore be reduced in addition, even without functional restrictions, more particularly without losses in terms of the leaktightness of the energy storage system.

According to another aspect of the invention, the opening of the housing can be or is hermetically closed by means of the cover device, in particular with the aid of the barrier layer.

Gas exchange and/or liquid exchange is thereby advantageously prevented even at the level of the housing. There is therefore no longer any need for additional protective measures, such as separate cell housings for the individual lithium-ion cells. It is thereby possible to keep down the number of parts in the energy storage system. In addition, functions such as sealing with respect to gases and/or liquids are advantageously transferred from the level of the cells to the level of the housing.

According to another aspect of the invention, the barrier layer can be formed from at least one of the following materials: silica, alumina, silicates, ethylene vinyl alcohol copolymer, aluminum and magnesium.

These are materials which have a low permeability and/or a low permeation coefficient. Such materials are therefore advantageously impermeable to gases and/or liquids. This improves the leaktightness of the energy storage system. Moreover, such materials are relatively inexpensive and easy to process.

According to another aspect of the invention, the cover device can be formed from a metallic material or from a metal-like substance. Since, in this case too, a material with a low permeability and/or with a low permeation coefficient is used, the entry and escape of liquids and/or gases into and out of the energy storage system is advantageously prevented. In particular, the function of sealing the housing can be integrated into the cover device. This, in turn, eliminates additional elements and additional manufacturing steps.

According to another aspect of the invention, the barrier layer can be connected materially, at least in some region or regions, in particular completely, to the inner surfaces of the housing, in particular being vapor-deposited on the inner surfaces of the housing.

This has the advantage that the transition between the housing and the barrier layer is improved, which, in turn, enhances the sealing properties and stability of the energy storage system.

According to another aspect of the invention, the barrier layer can be formed at least in some region or regions, preferably completely, from a film, which is connected, in particular being materially connected, to the inner surfaces of the housing.

The design of the barrier layer as a film advantageously has the effect that fewer defects can arise within the barrier layer and that there are fewer locations at which coating has failed to occur. The provision of the barrier layer as a film is therefore simple and reliable.

According to another aspect of the invention, the cover device can be designed in such a way that it can be connected materially to the housing, preferably by welding. This advantageously leads to hermetic closure of the interior space of the housing. That is to say that the interior space of the housing is protected, namely from the entry and escape of gases and/or liquids into the housing and out of the housing. Moreover, it is simple to implement and produce such a material connection.

According to another aspect of the invention, the housing can have a connecting region, which is designed to connect the housing to the cover device. Easier manufacture of the energy storage system is thereby advantageously achieved.

According to another aspect of the invention, the connecting region can extend perpendicularly outward away from the housing, more specifically in such a way that the housing is connected or can be connected to the cover device via the connecting region.

This has the advantage that the connecting region is more easily accessible and, as a result, is easier to manufacture.

According to another aspect of the invention, the connecting region can correspond to an extension of a wall of the housing which receives outer lateral surfaces of the cover device, more specifically in such a way that the housing is connected or can be connected to the outer lateral surfaces of the cover device via the connecting region.

This has the advantage, on the one hand, that the connecting region is already centered through the reception of the outer lateral surfaces of the covering device and, on the other hand, is easily accessible and, as a result, simple to manufacture.

According to another aspect of the invention, the energy storage system can furthermore have an electronics support. This is designed to receive electronic components—such as processors, memories, sensors and the like.

According to another aspect of the invention, the energy storage system can have a heat conducting element, which is arranged on a surface of the cover device in the direction of the interior space of the housing.

The heat conducting element improves heat dissipation or heat transfer from the interior space of the housing toward the outside and thereby protects the plastic elements arranged in the interior of the housing. It is thereby furthermore advantageously possible to increase the efficiency of the energy storage system.

According to another aspect of the invention, the cover device can be designed as a cooling device for regulating the temperature of the energy storage system. The function of cooling the energy storage system is thereby advantageously integrated into the cover device, leading to a further reduction in the number of parts.

According to another aspect of the invention, the cooling device can have a metal cooling plate, in particular a cooling plate having a multiplicity of cooling fins and cooling channels, wherein the cooling device is preferably manufactured, at least in some region or regions, in particular completely, from aluminum and/or from an aluminum alloy. This has the advantage that the efficiency of the cooling device is increased and, at the same time, a low weight with good thermal conductivity is achieved.

According to another aspect of the invention, the energy storage system can have a multiplicity of current collecting elements, wherein one current collecting element is connected or can be connected to each pole of the multiplicity of lithium-ion cells. Simple discharge or transmission of the cell current is thereby ensured.

According to another aspect of the invention, the energy storage system can have at least one busbar consisting of a multiplicity of busbar elements. By means of the at least one busbar, it is advantageously relatively simple to set the required current or the required voltage by series or parallel connection of the individual lithium-ion cells.

According to another aspect of the invention, the multiplicity of current collecting elements can be designed to be connectable to one of the at least one busbars, preferably permanently connectable, and particularly preferably connectable by means of a welded joint. This has the advantage that a low electric resistance arises in the region of the transition from the multiplicity of current collecting elements to the busbar, and therefore the electric flux or electric conductivity is improved.

According to another aspect of the invention, the multiplicity of current collecting elements and the at least one busbar form a labyrinth, which is designed to carry a gas formed during operation in the multiplicity of lithium-ion cells into a gas collecting channel. This has the advantage that there is no need for an additional element or additional elements to carry gas out of the cells. This leads to a reduction in the total number of parts in the energy storage system.

According to another aspect of the invention, the collecting channel can be arranged at least in an upper region of the interior space of the housing, preferably in an upper and in a lateral region of the housing, wherein, in particular, the gas collecting channel is integrated into the housing.

This advantageously leads to a reduction in the number of parts of the energy storage system and, furthermore, the energy storage system can be manufactured more simply and at lower cost.

According to another aspect of the invention, a membrane can be provided as a gas collecting channel boundary on the housing, preferably being integrated into the housing, wherein the membrane is preferably designed as a bursting membrane. This likewise advantageously leads to a reduction in the number of parts of the energy storage system and to easier and lower cost manufacture.

According to another aspect of the invention, the gas collecting channel can be formed from non-flammable material, in particular regions of the housing which form the gas collecting channel being formed from non-flammable material.

This has the advantage that regions in which the gas collecting channel is provided cannot easily start to burn. This improves the safety of the energy storage system.

According to another aspect of the invention, the energy storage system can have a cell support made of plastic, which is designed to receive the multiplicity of lithium-ion cells and to position them within the housing.

This has the advantage that the production of the energy storage system is simplified, namely inasmuch as the lithium-ion cells can be positioned in the cell support outside the housing and then inserted together into the housing without having to precisely center and/or arrange each individual lithium-ion cell.

According to another aspect of the invention, the at least one busbar can be connected to the cell support by means of staking, in particular hot staking. Staking or hot staking is a simple and low-cost method of connecting two elements made from different materials to one another. It is thereby possible to simplify the manufacturing method.

According to another aspect of the invention, a sealing element can be provided between the cell support and the busbar. A space in which a respective lithium-ion cell can be accommodated is thereby advantageously provided with additional sealing. This reduces the risk that moisture can penetrate into the lithium-ion cell.

The invention is described in more detail below, including regarding further features and advantages, using the description of embodiments with reference to the accompanying drawings.

In the figures.

The energy storage system according to the invention is described in greater detail below with reference to the depictions in FIGS. 1 to 5. Identical or equivalent elements and functions are provided with the same or similar reference characters.

Energy storage systems which are based on lithium-ion technologies are suitable, in particular, for use in vehicles 200. Moreover, an energy storage system 100 of this kind can likewise be used wherever energy storage systems with a relatively high power density are required.

The energy storage system 100 is described in such a way below that relative terms refer to the installed state of the energy storage system 100. Thus, "in an upper region" means in a region which is at the top when viewed in the installed state, "in a lateral region" means in a region which is situated in a left-hand or right-hand region in the installed state, and "in a lower region" means in a region which is at the bottom when viewed in the installed state, for example.

Figure 1:
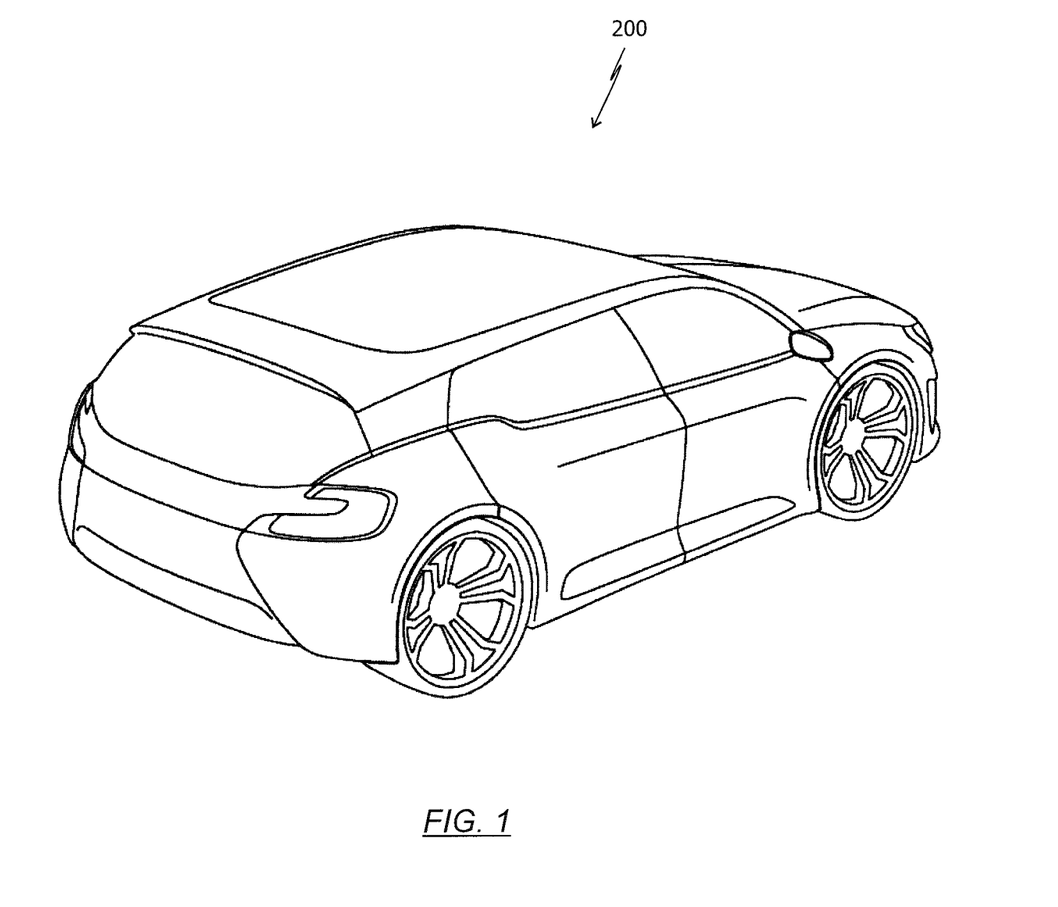
FIG. 1 shows a schematic depiction of a vehicle.

FIG. 1 shows a schematic depiction of a vehicle 200, which has at least one energy storage system 100 having a multiplicity of lithium-ion cells 10. In this case, the energy storage system 100 can be arranged in a region of the vehicle 200 which is at the front in the direction of travel, in a rear region of the vehicle 200 and/or in a region underneath the seats, in particular underneath the driver's seat.

The vehicle 200 can be an aircraft or a watercraft, a rail vehicle, an all-terrain vehicle, or preferably a road vehicle, wherein a road vehicle can mean a passenger vehicle, a truck, a bus, or a motor home.

The vehicle 200 is driven by a drive unit. The drive unit can comprise an internal combustion engine, an electric motor or a combination thereof. A vehicle 200 which is driven exclusively by an electric motor is referred to as an electric vehicle. A vehicle 200 which has both an electric motor and an internal combustion engine is referred to as a hybrid vehicle. Hybrid vehicles can furthermore be subdivided into microhybrid vehicles, mild hybrid vehicles, full hybrid vehicles and/or plug-in hybrid vehicles. Here, plug-in hybrid vehicles can be taken to mean any hybrid vehicle which is not only charged by means of the internal combustion engine but can likewise be charged by means of the power grid. Full hybrid vehicles means vehicles which can be driven exclusively by means of the electric motor. Microhybrid vehicles have a start-stop functionality and preferably also have a stop-in-motion functionality. Moreover, microhybrid vehicles can charge the energy storage system 100 by "brake energy recovery". Mild hybrid vehicles can furthermore have a boost function, which is used to assist the internal combustion engine to increase power.

Figure 2:
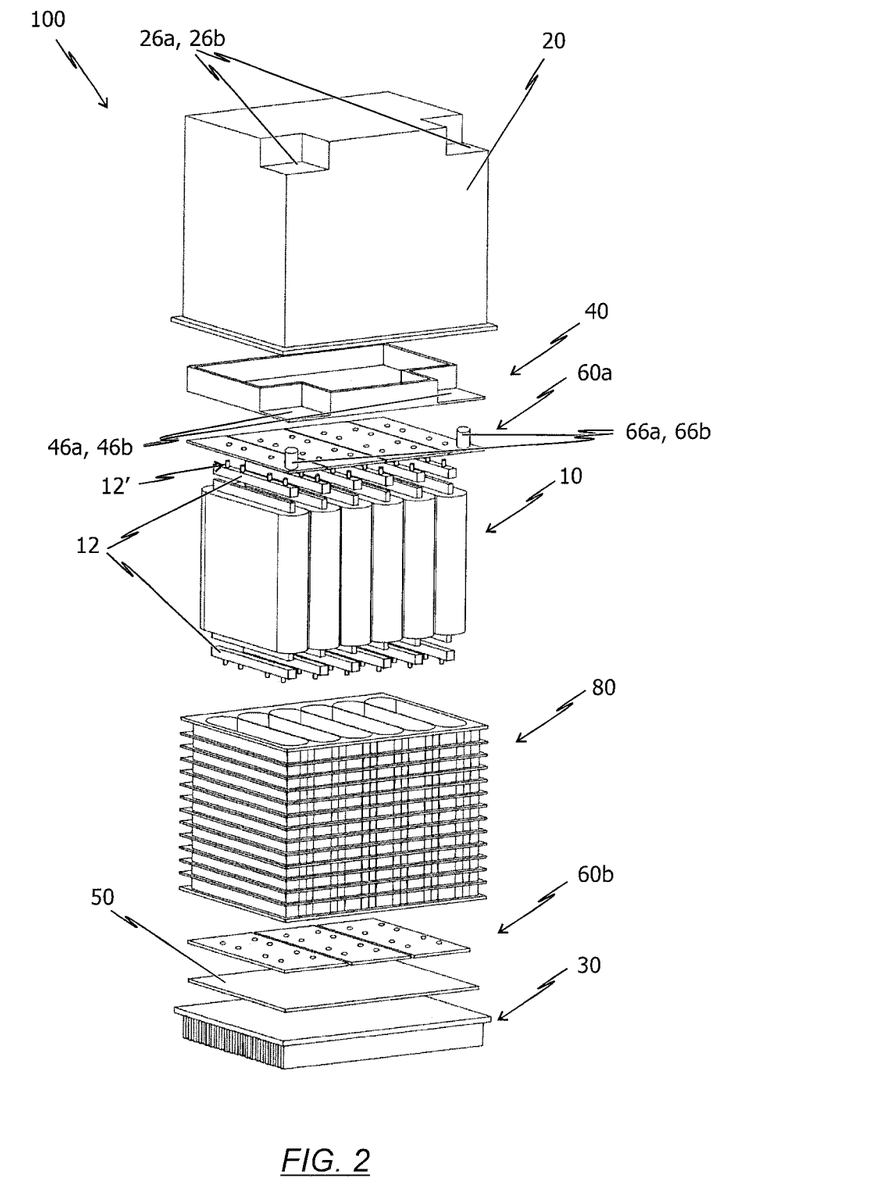
FIG. 2 shows a schematic depiction of an energy storage system according to the present invention.

FIG. 2 shows a schematic exploded depiction of an energy storage system 100 according to the present invention. According to this, the energy storage system 100 has a multiplicity of lithium-ion cells 10, wherein each lithium-ion cell 10 has a positive pole and a negative pole.

The lithium-ion cells 10 can be designed in such a way that the positive pole and the negative pole are in each case arranged on two mutually opposite sides of the lithium-ion cell 10.

Each lithium-ion cell 10 can preferably be designed as a "jellyroll cell", this advantageously being associated with a compact and space-saving construction of the lithium-ion cells 10.

A lithium-ion cell 10 can furthermore have its own housing 20. Preferably, however, the lithium-ion cells 10 are supplied without their own housing 20, which can advantageously reduce material and production costs since one production step is eliminated by the elimination of the cell housing.

The lithium-ion cells 10 are furthermore arranged in a housing 20. The housing 20 is formed from a multiplicity of wall elements, which form an interior space. The interior space is delimited by inner surfaces of the wall elements of the housing 20. In this arrangement, the wall elements of the housing 20 form a wall. The housing 20 furthermore has an opening in the wall, via which the lithium-ion cells 10 can be received in the housing 20.

The opening extends over at least a region of an area of one wall element, but preferably the opening extends over the entire area of one wall element. That is to say that the housing 20 is of open design on the same side as said one wall element.

As shown schematically in FIG. 2, the housing 20 can have recesses in two corner regions, said recesses being, in particular, of rectangular shape. The recesses are each designed in such a way that the bottom surfaces thereof form electric connection surfaces 26. Here, a first connection surface 26a is designed as a positive connection surface 26a and a second connection surface 26b is designed as a negative connection surface 26b. In this arrangement, one connection terminal of the energy storage system 100 can be connected to each electric connection surface 26.

To enable the housing 20 to be manufactured cost-effectively and in a simple manner but nevertheless to be robust, various prerequisites must be satisfied. On the one hand, the total weight of the energy storage system 100 should not be increased in order to avoid reducing the efficiency of the energy storage system 100. On the other hand, the interior space of the housing 20 must be closed off tightly from the environment, in particular hermetically closed off.

In general terms, "hermetically" has the meaning of impenetrable. A hermetic closure thus describes an absolutely leaktight closure, particularly one which prevents an exchange of gases or liquids. Hermetic closure of the interior space of the housing 20 is therefore taken to mean closing the housing 20 in such a way that the interior space is closed in a leaktight manner, more specifically in such a way that an exchange of substances, especially the exchange of gases and/or liquids, is prevented. In this context, an energy storage system, the interior space of which is sealed off only with respect to gases from the ambient air, with respect to gases which arise during operation in the interior space of the housing 20 and with respect to moisture from the environment is also referred to as hermetically sealed or as hermetically closed.

In order to make the energy storage system 100 as light as possible, a housing 20 made of plastic is chosen according to the invention. In this case, an acrylonitrile butadiene styrene, a polycarbonate, a polyamide, polyvinyl chloride, polyethylene terephthalate, polyoxymethylene or a copolymer thereof can be chosen, for example.

However, plastics are characterized at least substantially by relatively high permeability or semi-permeability relative to gases and/or liquids.

Permeability is understood as the characteristic of a solid of allowing gases and/or liquids to pass through. The transfer of gases and/or liquids through the solid is referred to as permeation. Here, permeation can be divided into the following three steps, namely: adsorption, corresponding to the take-up of the gas and/or liquid on the surface of the solid, diffusion, corresponding to the penetration of the gas and/or the liquid through the solid, and desorption, corresponding to the exit or emergence of the gas and/or the liquid from the solid. Semi-permeability is understood as the characteristic of a solid of being only partially permeable, i.e. of allowing through only molecules below a certain molecular mass or colloids or particles below a certain size. In the description below, the term "permeability" refers both to permeability and to semi-permeability.

A barrier layer 22 is therefore arranged, at least in some region or regions, preferably over the entire area, between the interior space of the housing 20 and the inner surfaces of the housing 20 which delimit the interior space. The barrier layer 22 is designed to prevent the entry and exit of gases and/or liquids into or from the interior space of the housing 20.

In general, a barrier layer 22 is taken to mean a layer which has relatively good barrier properties. Barrier properties, in turn, are taken to mean no permeability or only slight permeability to gases and/or liquids. In particular, the barrier layer 22 is taken to mean a layer, the permeability of which is lower than the permeability of the housing 20.

In this context, the term "barrier layer" refers to a layer which is impermeable to gases in the ambient air, to gases which arise in the interior space of the housing 20 during the operation of the energy storage system 100 and to moisture in the environment. In particular, the interior space of the housing 20 is sealed off hermetically from the external environment with the aid, inter alia, of a barrier layer of this kind.

In this context, the barrier layer 22 can be constructed from metal, metal oxide and/or silicates. A barrier layer 22 made from ethylene-vinyl alcohol copolymer is also conceivable. Active barrier layers 22 can furthermore also be used. These are taken to mean barrier layers 22 which can (chemically) bind the gases and/or liquids. The metal can be or comprise a light metal, in particular aluminum and/or an aluminum alloy or magnesium and/or a magnesium alloy.

The barrier layer 22 can be connected materially, at least in some region or regions, to the inner surfaces of the housing 20, it being possible, in particular, for the barrier layer 22 to be vapor-deposited on the inner surfaces of the housing 20. This is preferably accomplished by chemical vapor deposition or physical vapor deposition.

It is likewise possible for the barrier layer 22 to be formed, at least in some region or regions, in particular completely, as a foil which is connected to the inner surfaces of the housing 20. This is preferably a metal foil, which is connected materially to the inner surfaces of the housing 20.

As an alternative, it is also possible to form the housing 20 in such a way that a two- or multi-ply material comprising at least one plastic layer and the barrier layer 22 is deep drawn, more specifically in such a way that the barrier layer 22 is arranged facing the interior space of the deep drawn housing 20. Thus, even the feedstock for the housing 20, i.e. the material from which the housing 20 is to be manufactured, can be connected to the barrier layer 22, in particular materially connected, simplifying the production of the housing 20 and thus potentially leading to cost savings and a reduction in effort.

Moreover, each pole of a lithium-ion cell 10 can be connected or connectable to one current collecting element 12.

In order to ensure simpler and more precise assembly of the lithium-ion cells 10, the lithium-ion cells 10 can be arranged in a cell support 80. The cell support 80 has a multiplicity of apertures and is designed in such a way that one lithium-ion cell 10 is accommodated in each aperture. The lithium-ion cells 10 can then be positioned precisely in the interior space of the housing 20 with the aid of the cell support 80.

Moreover, FIG. 2 depicts that an energy storage system 100 according to the present invention can have at least one busbar 60a, 60b comprising a multiplicity of busbar elements. The busbar 60a, 60b is connected to the lithium-ion cells 10 in such a way that the cells are connected in series or in parallel. Series connection of the lithium-ion cells 10 is provided when a higher operating voltage of the energy storage system 100 is required. If, however, a higher capacity of the energy storage system 100 is required, parallel connection of the lithium-ion cells 10 is provided.

It should be noted here that busbar 60a has one positive connection element 66a and one negative connection element 66b, as indicated schematically in FIG. 2.

Furthermore, the busbar 60a, 60b can be connected to the lithium-ion cells 10 via the current collecting elements 12. This preferably takes place via a welded joint.

As is furthermore shown in FIG. 2, the current collecting elements 12 can be arranged between the busbar 60a, 60b and the lithium-ion cells 10. In this case, a current collecting element 12 can in each case preferably be connected via a plug connection to one pole of a lithium-ion cell 10. Via such a connection, the current collecting elements 12 can advantageously be connected quickly and simply. It is likewise conceivable to connect each current collecting element 12 to one pole of a lithium-ion cell 10 via a welded joint.

The current collecting elements 12 can furthermore be connected to the busbar 60a, 60b by means of a multiplicity of elongate elements 12', which are arranged on a surface of the current collecting elements 12 situated opposite the lithium-ion cells 10 on one side, being connected in such a way that the elongate elements 12' extend at least partially through apertures in the busbar 60a, 60b. Each elongate element 12', which extends at least partially through an aperture in the busbar 60a, 60b, can preferably be connected to said busbar by means of a welded joint.

The busbar 60a, 60b can furthermore be connected to the cell support 80. The busbar 60a, 60b is preferably connected to the plastic cell support 80 by means of staking, in particular hot staking.

It is furthermore conceivable to connect the busbar 60a, 60b positively to the cell support 80. For this purpose, the cell support 80 should have an undercut in a region which receives the busbar 60a, 60b, into which undercut the busbar 60a, 60b can be inserted.

Hot staking is suitable especially for connecting components of different materials. Thus, the busbar 60a, 60b, which is preferably manufactured from metal, especially aluminum, an aluminum alloy, copper or a copper alloy, can advantageously be connected to the cell support 80, which is preferably manufactured from plastic, in particular polyamide, polyethylene terephthalate, polycarbonate, polyoxymethylene and/or polyolefins, such as polypropylene and/or polyethylene.

FIG. 2 furthermore indicates that an electronics support 40 can be provided in an upper region of the interior space of the housing 20. In this case, the electronics support 40 can be formed from plastic. A plastic from the group comprising polyamides, polyethylene terephthalates, polyoxymethylene, polycarbonates, acrylonitrile butadiene styrene, polyolefins and/or polyvinylchlorides is suitable, in particular. The electronics support 40 is designed to be received in the housing 20.

The electronics support 40 is formed at least substantially from a flat bottom element and a wall, wherein the wall is designed to enable the electronics support 40 to be received in the upper region of the interior space of the housing 20, in particular in such a way that the wall of the electronics support 40 follows the internal contour of the housing 20—and in particular the internal contour of the recesses.

Furthermore, contact surfaces 46 extend as an extension of the bottom element into the regions in which the recesses of the housing 20 are received or can be received. In this case, provision is made for the contact surfaces 46 to make electric contact with a respective connection surface 26 of the housing 20 by means of a first surface.

It is furthermore possible, in particular, for the contact surfaces 46 to be arranged in such a way that the contact surfaces 46 make electric contact with the respective connection element 66a, 66b of the busbar 60a by means of a second surface situated opposite the first surface.

The electronics support 40 is provided in the housing 20 of the energy storage system 100 in order to be able to receive a multiplicity of electronic devices. Thus, the electronics support 40 can have sensors for monitoring one and/or more lithium-ion cells 10, for example, and it is likewise furthermore possible for a microprocessor, a nonvolatile memory unit and/or a control unit to be accommodated in the electronics support 40.

The electronics support 40 can be provided as a separate component in the interior space of the housing 20, this being associated with a simple production and arrangement process. However, it is also conceivable to integrate the electronics support 40 into the housing 20. In this case, the electronics support 40 corresponds at least in some region or regions to a wall element of the housing 20. In particular, the electronics support 40 replaces a wall element of the housing 20. For this purpose, the barrier layer is arranged between the inner surfaces of the remaining wall elements and a surface of the electronics support 40, which faces the interior space, and the interior space.

The energy storage system 100 according to the invention is furthermore designed in such a way that the opening of the housing 20 is closed or can be closed, in particular hermetically closed, with the aid of the cover device 30. For this purpose, the cover device 30 is designed in such a way that it is or can be connected to the housing 20, more specifically in such a way that the cover device 30 forms, at least in some region or regions, an outer surface of the housing 20 which is closed in this way.

The cover device 30 is preferably designed as a cooling device. The cooling device can have a multiplicity of cooling elements and is designed to regulate the temperature of the energy storage system 100, in particular in the interior space of the housing 20. This includes both the dissipation of heat which arises during the operation of the lithium-ion cells 10 and, where appropriate, the supply of heat to ensure an optimum operating temperature.

The cooling device can have a metal cooling plate. The metal cooling plate can furthermore have a multiplicity of cooling fins and/or cooling channels.

The cooling device can be manufactured from aluminum and/or an aluminum alloy.

It is also conceivable for a further barrier layer 22 to be provided on a surface of the cover device 30 in the direction of the interior space. The housing 20 can thereby advantageously be connected in a simple manner to the cover device 30 since the connection is ideally established by means of layers of the same material.

The cover device 30 can furthermore be designed in such a way that it can be connected materially to the housing 20. The cover device 30 is preferably designed in such a way that it can be welded to the housing 20.

The housing 20 of the energy storage system 100 can furthermore have a connecting region 24, which is designed to connect the housing 20 to the cover device 30.

On the one hand, the connecting region 24 can extend perpendicularly outward away from the housing 20, in particular perpendicularly to the wall elements sur-rounding the opening. It should be noted here that the barrier layer is also arranged along the connecting region 24, more specifically in such a way that the barrier layer is not interrupted. Accordingly, the connecting region 24 is arranged in such a way that the connecting region 24 is at least substantially parallel to the surface of the cover device 30 by means of which the housing 20 is connected or can be connected to the cover device 30. This makes it possible to optimize manufacture and assembly since the manufacturing tolerances selected can be relatively larger in this case. Moreover, the connecting region 24 is easily accessible.

The housing 20 can be connected to the cover device 30 by means of fusion welding or pressure welding.

Even if not explicitly depicted in the drawings, it is also conceivable to design the connecting region 24 in such a way that it corresponds at least substantially to an extension of the wall of the housing 20, wherein the connecting region 24 is designed to receive outer lateral surfaces of the cover device 30. In this case, the housing 20 is connected or can be connected to the outer lateral surfaces of the cover device 30 via the connecting region 24.

A heat conducting element 50 can furthermore be provided in the interior space of the housing 20 of the energy storage system 100. This can be arranged, in particular, on the surface of the cover device 30 in the direction of the interior space.

The heat conducting element 50 can be manufactured from thermally conductive and electrically insulating material. The heat conducting element 50 is preferably manufactured from silicone-based materials.

Here, the heat conducting element 50 helps to dissipate the heat which arises during the operation of lithium-ion cells 10 from the interior space of the energy storage system 100. This improves the service life of the components used, in particular that of the plastic cell support 80. Here, heat conduction takes place particularly from the lithium-ion cells 10 via the current collecting elements 12 and the busbar 60a, 60b to the heat conducting element 50 and preferably from the heat conducting element 50 to the outside via the cooling device.

Figure 3:
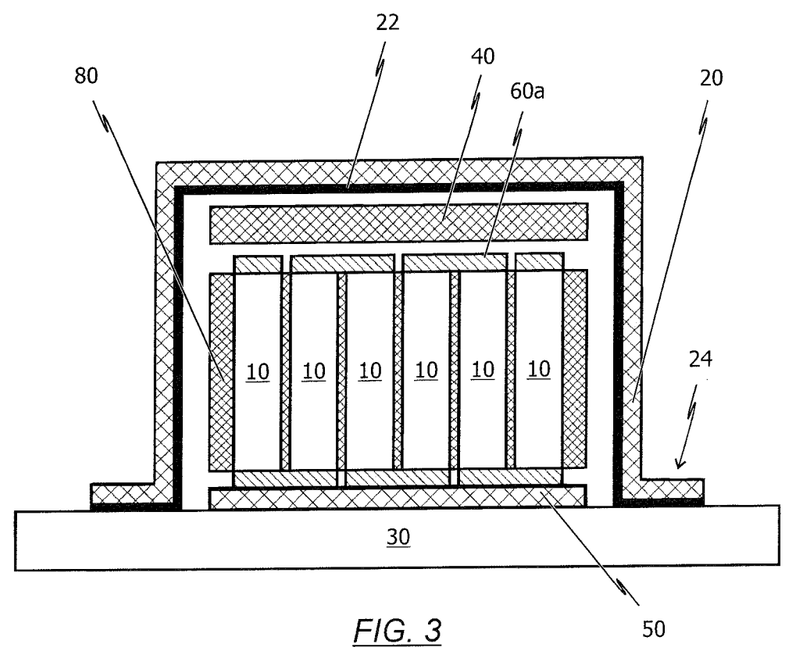
FIG. 3 shows a schematic section through the energy storage system according to the invention.

FIG. 3 shows an illustrative and schematic depiction of an energy storage system 100 according to the invention in section. The energy storage system 100 has a housing 20 consisting of a multiplicity of wall elements, which has an opening that extends at least in some region or regions along a surface of a wall element. In the illustrative depiction shown in FIG. 3, the opening extends over the entire surface of the lower wall element.

FIG. 3 furthermore shows an illustrative connecting region 24 of the housing 20, which extends perpendicularly outward from the housing 20, more specifically in such a way that the connecting region 24 is at least substantially parallel to an upper surface of the cover device 30, which is to be connected to the housing 20.

It can furthermore be seen that a barrier layer 22 is arranged between the inner surfaces of the housing 20 and the interior space, wherein the barrier layer 22 furthermore extends along the connecting region 24, more specifically in such a way that the barrier layer 22 is not interrupted at any point.

By way of example, a heat conducting element 50 is arranged between the cover device 30 and the busbar 60a, 60b, said element being designed to dissipate the heat arising during the operation of the lithium-ion cells 10 to the outside via the cover device 30. For this purpose, the cover device 30 is preferably designed as a cooling device.

Figure 4:
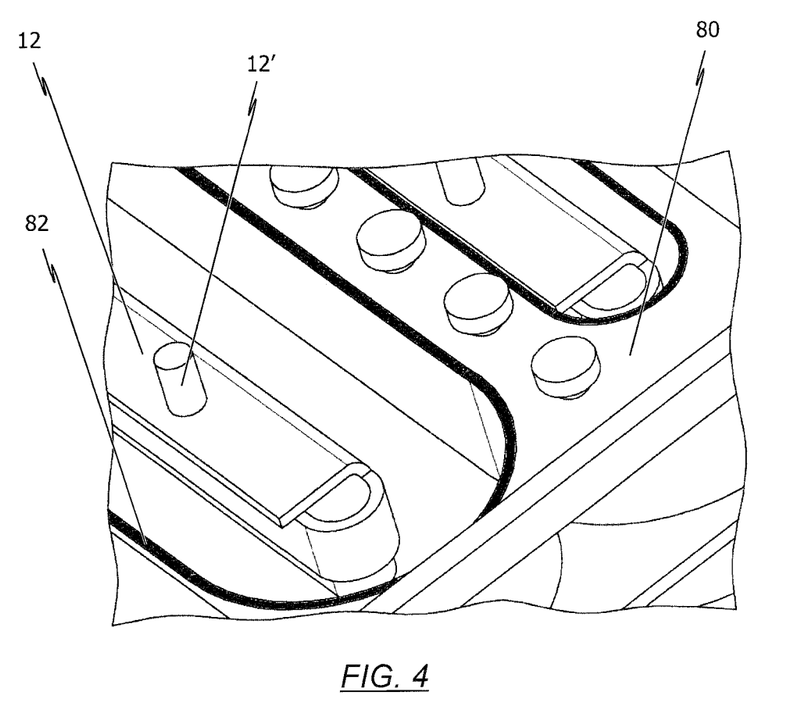
FIG. 4 shows a schematic depiction of a seal between a cell support and a busbar according to the present invention.

FIG. 4 shows an illustrative additional seal between a cell support 80 and a busbar 60a of an energy storage system 100. In this case, a sealing element 82 is arranged along an aperture of a cell support 80, in which a lithium-ion cell 10 can be received. If the busbar 60a is now connected to the cell support 80, the aperture of the cell support 80 is simultaneously sealed off from the interior space of the energy storage system 100. The operation of lithium-ion cells 10 is thereby advantageously further enhanced since penetration and escape of moisture and/or gases is made more difficult.

Moreover, the seal 82 is required to keep the electrolyte, in particular the liquid electrolyte, in the lithium-ion cells 10, to ensure, in particular that each lithium-ion cell 10 has its own cell space sealed off with respect to liquids (with respect to the electrolyte). Otherwise, a short circuit via the electrolyte could lead to increased self-discharge of the cell assembly. By virtue of this seal 82, the electrolyte is advantageously prevented from running out.

Thus, the busbars 60a, 60b can also be used to seal off the respective cell spaces within the cell support 80, thereby making it possible to dispense with additional sealing elements. The construction of the energy storage system 100 is thus further simplified.

For example, it is possible here to provide an energy storage system 100, the housing 20 of which has a barrier layer 22 which prevents only gas exchange between the interior space of the housing 20 and an external space outside the energy storage system 100. In this case, the seal 82 seals off one or more cell spaces formed by the apertures in the cell support 80 with respect to liquids, and wherein the cell spaces are each designed to receive one lithium-ion cell 10. As a particular preference, the lithium-ion cells 10 do not have their own cell housing here; on the contrary, the cell support 80 forms the cell housing. In this case, the seal is advantageously designed to keep the electrolyte, in particular the liquid electrolyte, within the lithium-ion cells 10 or the cell spaces formed by the apertures in the cell support 80.

It is furthermore indicated diagrammatically that the cell support 80 can accommodate lithium-ion cells 10 of different shapes. For this purpose, the cell support 80 must have apertures corresponding to the individual cells. However, cells of the same type are preferably provided. This leads to simpler manufacture and mounting of the cells in the cell support 80.

Figure 5:
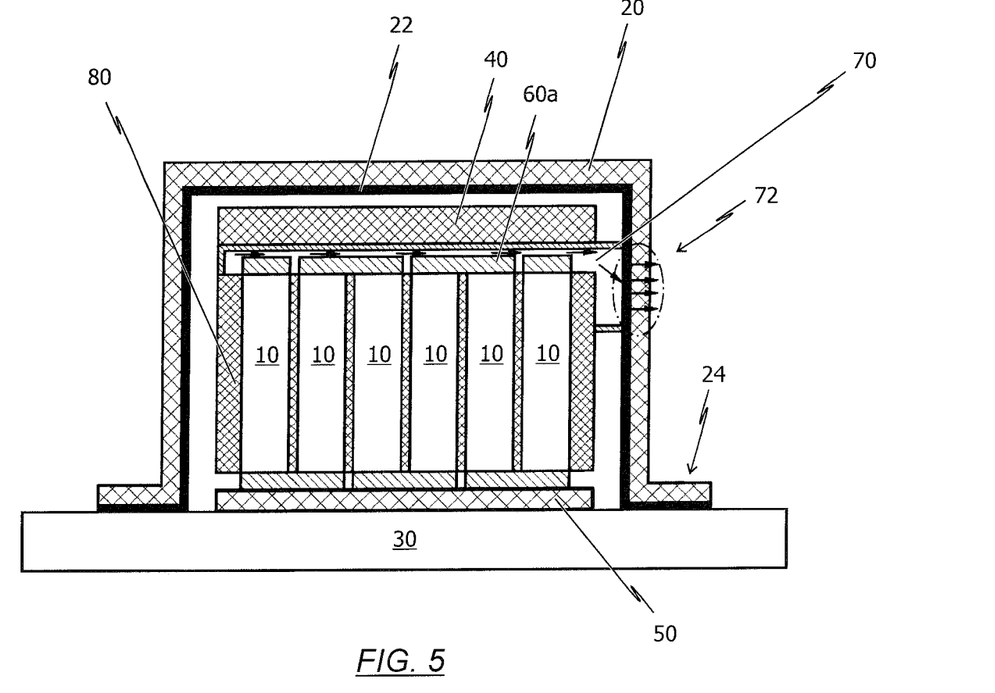
FIG. 5 shows a schematic depiction of a gas collecting channel in an energy storage system according to the present invention.

FIG. 5 shows a schematic depiction of a gas collecting channel 70, which is formed in an upper region of the interior space of the energy storage system 100. In this case, the gas emerging from the individual lithium-ion cells 10 can flow into the gas collecting channel 70 via a labyrinth, which is integrated into the current collecting elements 12 and the busbar 60a, 60b. In particular, the gas collecting channel 70 is arranged in an upper region of the interior space of the housing 20 and in a lateral region of the interior space of the housing 20. The gas collecting channel 70 can equally well be integrated into the housing 20. However, the gas collecting channel 70 can also preferably be formed between the cell support 80 and the electronics support 40. In this case, the gas collecting channel 70 can be associated with all the lithium-ion cells 10 and can thus be a common gas collecting space 70.

A membrane 72 can furthermore be provided on the housing 20 as a gas collecting channel outlet. The membrane 72 is preferably integrated into the housing 20. The membrane 72 can furthermore be a bursting membrane which is designed to burst at a relatively high pressure, in particular to burst when an internal pressure exceeds a predetermined or determinable internal pressure. This has the effect that, in the worst case, an energy storage system 100 based on lithium-ion technologies can fail in a controlled manner. This makes it possible to increase the operating safety and furthermore to ensure relatively safe exchange and/or removal of the faulty energy storage system 100.

The functionality of the bursting membrane can also be integrated into the housing 20 itself, namely into the housing 20 and the barrier layer 22. This advantageously keeps down the number of parts in the energy storage system 100, leading to lower production and manufacturing costs.

In particular, the membrane 72 can be designed as a disk-shaped plastic component which has a substantially flat lower side (i.e. surface facing the interior space of the housing 20) and a profiled upper side (i.e. surface facing an exterior of the housing 20). In this case, the profiled upper side can have a raised central region and a raised edge region with increased material thicknesses, wherein the (annular) region between the central region and the edge region has a smaller material thickness. In this case, the material thickness can decrease continuously within the annular region. The central region and the edge region can also have the same material thickness. However, it is equally conceivable for the edge region to have a greater material thickness than the central region. At the same time, the membrane can be integrated directly into the housing 20. As an alternative, it is also conceivable for the membrane 72 not to be designed as a separate component but for the profiling to be formed directly in the housing 20 itself, in particular in a region of the housing 20 where the gas collecting channel outlet is provided.

It is also conceivable for the housing 20 to be a metal housing with a (thin) plastic layer for electric (and thermal) insulation. It is thereby possible to prevent entry of liquid and/or gases and the like into and out of the housing while, at the same time, electric (and thermal) insulation can be ensured by means of the plastic layer.

At this point it should be noted that all the parts described above, viewed on their own or in any combination, in particular the details shown in the drawings, are claimed as essential to the invention. Amendments thereof are familiar to the person skilled in the art.

LIST OF REFERENCE SIGNS 10 lithium-ion cell
12 current collecting element

12' elongate element
20 housing
22 barrier layer
24 connecting region
26 (26a, 26b) connection surfaces
30 cover device
40 electronics support
46 (46a, 46b) contact surfaces
50 heat conducting element
60a, 60b busbar
66 (66a, 66b) connection element
70 gas collecting channel
72 membrane
80 cell support
82 sealing element
100 energy storage system
200 vehicle

The invention claimed is:

1. An energy storage system for use in a vehicle, the energy storage system comprising:
a multiplicity of jellyroll lithium-ion cells, each having a positive pole and a negative pole;
a housing having four sidewalls, a fifth wall integrally formed with the sidewalls and an opening opposite the fifth wall, the housing defining an interior space for receiving the lithium-ion cells, wherein the housing includes plastic, and wherein a barrier layer is provided, at least in a region, between the interior space of the housing and inner surfaces of the housing which delimit the interior space, the barrier layer including a formulation of at least one of the following materials: silicon oxide, aluminum oxide, silicates, ethylene-vinyl alcohol copolymer, or magnesium, wherein the barrier layer includes a layer which is impermeable to gases in ambient air, to gases which arise in the interior of the housing during operation of the energy storage system, and to moisture in an external environment;
a cell support comprising plastic configured to receive the multiplicity of lithium-ion cells and position the multiplicity of jellyroll lithium-ion cells within the housing, the cell support being separate from the housing; and
a cover device made of a metallic material or from a metal-like substance and configured as a cooling device for regulation of a temperature of the energy storage system,
wherein the cover device is further configured to connect to the housing at a fusion weld or a pressure weld in such a way that the opening of the housing is closable, wherein the cover device includes an outer surface of the housing which is closed in this way, wherein the cover device comprises a metal cooling plate having a multiplicity of cooling fins and cooling channels, and wherein the cover device with an aid of the barrier layer provide for a hermetic closure of the opening,
wherein the energy storage system furthermore has a heat conducting element in the form of a sheet or plate, which is made of a thermally conductive and electrically insulating material and which is arranged on a surface of the cover device in a direction of the interior space of the housing, wherein the energy storage system has at least one busbar arranged on the heat conducting element,
wherein the housing has a connecting region, which is designed to connect the housing to the cover device, said connecting region being a flange wall that is integrally formed with the sidewalls of the housing and that extends perpendicularly outward away from and lateral to the sidewalls of the housing and parallel to the cover device, wherein the barrier layer is also arranged along the connecting region in such a way that the barrier layer is not interrupted.

2. The energy storage system of claim 1, wherein the barrier layer is connectable to the inner surfaces of the housing.

3. The energy storage system of claim 1, wherein the barrier layer is formed at least in some region or regions from a film, which is materially connected to the inner surfaces of the housing.

4. The energy storage system of claim 1, wherein the cover device is materially connected to the housing.

5. The energy storage system of claim 1, wherein the energy storage system furthermore has an electronics support.

6. The energy storage system of claim 1, wherein the cooling device is manufactured, at least in some region or regions, from at least one of aluminum and an aluminum alloy.

7. The energy storage system of claim 1, wherein the energy storage system has a multiplicity of current collecting elements, wherein one current collecting element is connectable to each pole of the multiplicity of lithium-ion cells.

8. The energy storage system of claim 7, wherein the at least one busbar consists of a multiplicity of busbar elements, and wherein the multiplicity of current collecting elements is designed to be connectable to one of the at least one busbars consisting of a multiplicity of busbar elements.

9. The energy storage system of claim 8, wherein the multiplicity of current collecting elements and the at least one busbar are configured to channel a gas formed during operation in the multiplicity of lithium-ion cells into a gas collecting channel.

10. The energy storage system of claim 9, wherein the gas collecting channel is arranged at least in an upper region or in at least in an upper region and in a lateral region of the interior space of the housing.

11. The energy storage system of claim 9, wherein a membrane is provided as a gas collecting channel boundary on the housing.

12. The energy storage system of claim 9, wherein the gas collecting channel is formed from non-flammable material.

13. The energy storage system of claim 1, wherein at least one busbar consisting of a multiplicity of busbar elements is connected to the cell support by means of staking.

14. The energy storage system of claim 13, wherein a sealing element is provided between the cell support and the busbar.

15. A hybrid vehicle having the energy storage system of claim 1.

16. The energy storage system of claim 1, wherein the housing is connectable to outer lateral surfaces of the cover device via the connecting region.

17. The energy storage system of claim 8, wherein the multiplicity of current collecting elements is designed to be in permanent connection with one of the at least one busbars by means of a welded joint.

18. The energy storage system of claim 11, wherein the membrane is integrated into the housing, and wherein the membrane is designed as a bursting membrane.

* * * * *